(12) United States Patent
Tomobuchi et al.

(10) Patent No.: US 6,375,590 B1
(45) Date of Patent: Apr. 23, 2002

(54) TOOTHED BELT

(75) Inventors: Masato Tomobuchi; Tatsuo Arai; Hiroshi Kikuchi, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/550,161

(22) Filed: Apr. 14, 2000

(30) Foreign Application Priority Data

Apr. 14, 1999 (JP) .......................................... 11-106460

(51) Int. Cl.$^7$ ................................................. F16G 5/20
(52) U.S. Cl. ...................................... 474/263; 474/264
(58) Field of Search ................................. 474/205, 237, 474/260, 261, 262, 263, 264, 265

(56) References Cited

U.S. PATENT DOCUMENTS

| | | | | |
|---|---|---|---|---|
| 5,387,160 A | * | 2/1995 | Nakajima et al. | 474/205 |
| 5,599,246 A | * | 2/1997 | Fujiwara et al. | 474/205 |
| 5,860,883 A | * | 1/1999 | Johen et al. | 474/205 |

* cited by examiner

Primary Examiner—David A. Bucci
Assistant Examiner—Vicky A. Johnson
(74) Attorney, Agent, or Firm—Dann, Dorfman, Herrell and Skillman, P.C.; Henry H. Skillman

(57) ABSTRACT

A toothed belt particularly suitable for use in general industrial machineries includes a cured rubber belt body, a tensile member embedded in the belt body, and a tooth fabric adhered to the surface of teeth of the belt body. The belt body is formed primarily from a vulcanizable rubber composition containing hydrogenated nitrile rubber and zinc polymethacrylate. The zinc polymethacrylate and the hydrogenated nitrile rubber are blended together in a ratio of from 22:78 to 45:55 parts by weight. To the vulcanizable rubber composition, a vulcanizing agent comprised of peroxide and a reinforcer comprised of carbon black are added, and a mixture is vulcanized and pressed or otherwise molded to form the afore-said cured rubber belt body with the tensile member embedded therein. The tensile member is made of high-strength glass fibers. The glass fibers preferably have a resorcin-formalin-latex layer and an overcoat layer both formed thereon.

9 Claims, 1 Drawing Sheet

TOOTHED BELT

BACKGROUND OF THE INVENTION

1. Field of the Invention

The present invention relates to a toothed belt for power transmission, and more particularly to a power-transmission toothed belt for use in general industrial machineries. The toothed belt of the type concerned is used for transmitting power from one pulley to another rotated at low speeds under heavily-loaded conditions.

2. Description of the Related Art

A toothed belt for driving a camshaft of an automobile engine is used under the conditions where the low-temperature resistance, high-temperature resistance, flexing resistance and quietness are severely required. Currently, the toothed belt is produced by vulcanizing and pressing (or otherwise molding) a rubber composition containing, as major ingredients, hydrogenated nitrile rubber and zinc polymethacrylate after several additives are blended with the rubber composition.

On the other hand, toothed belts designed for use in general industrial machineries are mainly used for the purpose of transmitting power between two shafts and they operate at low speeds under heavily loaded conditions. Under such conditions, the high-temperature resistance and quietness, such as required in an application to automobile engines, are not necessary. More specifically, a heat resistance on the order of 80° C. is sufficient, and a low-temperature resistance enough to withstand the room temperature is satisfactory. In addition, the flexing resistance is not highly demanded. In the manufacture of the toothed belts for general industrial machineries, urethane rubber is selected for this purpose as a main component because the urethane rubber can provide sufficient physical properties even when the rigidity thereof is increased within a certain range. The urethane rubber is vulcanized and pressed or otherwise molded into a toothed belt with a tensile member made of aromatic polyamide fibers being embedded in the urethane rubber.

The toothed belts designed for use in general industrial machineries may occasionally be used at high speeds. In this instance, a rubber portion forming teeth (hereinafter referred to as "tooth rubber") of the toothed belts becomes soft due to high self-heating properties of the urethane rubber. As a consequence, the rigidity of tooth rubber decreases, tending to cause a breakage of teeth present on the toothed belts. This same teeth breakage problem may also occur when the toothed belts are used under high temperature environmental conditions.

Thus rubber compositions are used for automobile engines to produce a toothed belt for general industrial machineries. However, since the conventional toothed belts for automobile engines are designed for use under relatively low load conditions, if components of the rubber composition are changed to withstand the heavily loaded conditions, the high-temperature resistance, low-temperature resistance, flexing resistance and quietness are lost.

In addition, since aromatic polyamide fibers are used in making the tensile member of the conventional toothed belts, the dimensional stability of the tensile member is relatively low because the fibers are likely to undergo elongation and contraction when subjected to changes in the temperature, humidity or the like environmental condition. Use of such dimensionally unstable tensile members brings about remarkable changes in the tooth-belt tension, leading to reduction of the lifetimes of the toothed belts and peripheral devices as well as the generation of unpleasant operation noises.

Furthermore, since the aromatic polyamide fibers poorly adhere to the urethane rubber, a peel-off problem of the tooth rubber may arise. In addition, it is difficult to improve the bonding strength between the fibers. Thus, in heavily loaded, high-speed applications, the toothed belt encounters a tooth-breakage problem as well as a breakage of the toothed belt.

SUMMARY OF THE INVENTION

It is therefore an object of the present invention to provide a toothed belt having qualities suitable for use in general industrial machineries.

Another object of the present invention is to provide a toothed belt formed from a rubber composition which is capable of withstanding heavily loaded, high-speed conditions.

A further object of the present invention is to provide a toothed belt formed from a rubber composition which has a formulation improved to increase the lifetime of the toothed belt and lower operation noises of the toothed belt.

Still another object of the present invention is to improve the affinity between a rubber composition and a tensile member of the tooth belt thereby increasing the bonding strength a between rubber and the tensile member to such an extent that the tooth rubber peel-off problem from the toothed belt is completely prevented.

In one aspect, the present invention provides a toothed belt comprising a cured rubber belt body formed primarily from a vulcanizable rubber composition containing hydrogenated nitrile rubber and zinc polymethacrylate, and a tensile member embedded in the belt body, wherein the rubber composition is comprised of zinc polymethacrylate and hydrogenated nitrile rubber having an iodine value of 4–28 g which are blended together in a ratio of 22:78 to 45:55 parts by weight.

In a toothed belt having a belt body formed from a vulcanizable rubber composition containing hydrogenated nitrile rubber and zinc polymethacrylate, the zinc polymethacrylate forms a higher-order network structure in a polymer of the belt body. Accordingly, a proportion of the zinc polymethacrylate must be held down to some extent; otherwise, in an application where the toothed belt is driven to run at high speeds along a complicated path, the toothed belt would encounter a problem that the flexing resistance is remarkably reduced and the belt body separates or peels off from the tensile member.

However, since the general industrial machineries require heavy duty power transmission, toothed belts used therein operate at relatively low speeds because they are mainly used for the purpose of achieving power transmission between two shafts. In the present invention, this particular use or application is perceived, and the aforesaid higher-order network structure forming-function of the zinc polymethacrylate is utilized so that a rubber composition containing hydrogenated nitrile rubber and zinc polymethacrylate can possess an on-load performance (load-bearing properties) which is improved to the level of urethane rubber. The on-load performance is particularly chosen from among many performances of the conventional toothed belts required for use in the general industrial machineries.

To improve the on-load performance, the present invention sets the blending ratio of zinc polymethacrylate and hydrogenated nitrile rubber to be in a range of 22:78 to 45:55 parts by weights. If the proportion of zinc polymethacrylate is below 22 parts by weight, a belt body formed after vulcanization of the rubber composition achieves an insufficient on-load performance and, hence, the belt body is not suitable for use in the general industrial machineries requiring heavy duty power transmission. Conversely, if the proportion of zinc polymethacrylate exceeds 45 parts by weight, the hardness of the belt body is increased to a level which makes the flexing resistance and quietness of the toothed belt unsatisfactory even in an application to the general industrial machineries.

Preferred examples of the hydrogenated nitrile rubber used in the present invention include hydrogenated nitrile rubber with a nitrile content of 30 to 50% and having an iodine value of 4–28 g. These examples include a 90–98% hydrogenated nitrile rubber which is available in the market (under the product name "Z-pole series" of Nippon Zeon Co, Ltd.

If the iodine value is not greater than 4 g, a great amount of vulcanizing agent added to provide prescribed rubber properties exerts a negative influence to the resorcin-formalin-latex of the tensile member (core) such that an unnecessarily great rigidity is provided to the toothed belt, tending to lower the flexural fatigue resistance of the toothed belt. Conversely, if the iodine value exceeds 28 g, an attempt to provide the prescribed rubber properties will deteriorate the heat resistance and ozone resistance and thereby lower the effect of the hydrogenated nitrile rubber to such an extent that the use of normal nitrile rubber is rather economical.

The rubber composition is preferably formed of a polymer alloy composite material and hydrogenated nitrile rubber having an iodine value of 4–28 g which are blended together in a ratio of 55:45 to 90:10 parts by weight. The polymer alloy composite material is formed of zinc polymethacrylate and hydrogenated nitrile rubber having an iodine value of 4–28 g which are dispersed in a ratio of 40:60 to 50:50 parts by weight.

The polymer alloy composite material is prepared, then the hydrogenated nitrile rubber is added to the polymer alloy composite material, so that before vulcanization is carried out, the zinc polymethacrylate can be homogeneously dispersed in the hydrogenated nitrile rubber, leading to formation of a cured rubber belt body having a fine, higher-order network structure. With this process, an on-load performance can be obtained which is more suitable for use in the general industrial machineries than that obtained by a process in which hydrogenated nitrile rubber and zinc polymethacrylate are initially blended together.

In another aspect, the present invention provides a toothed belt comprising a cured rubber belt body formed primarily from a vulcanizable rubber composition containing nitrile rubber having a Mooney viscosity of 30–90 at 100° C. and zinc polymethacrylate, and a tensile member embedded in the belt body, wherein the nitrile rubber and the zinc polymethacrylate are blended together in a ratio of 100:20 to 100:60 parts by weight.

The hydrogenated nitrile rubber is relatively expensive. In view of this, the nitrile rubber is used in place of the hydrogenated nitrile rubber. With respect to the heat resistance and ozone resistance, the nitrile rubber is inferior to the hydrogenated nitrile rubber but use of the nitrile rubber can avoid over-quality when the toothed belt is used under low-temperature environmental conditions not accompanying generation of ozone at high densities.

Use of the zinc polymethacrylate greatly deteriorates the productively of the rubber composition and properties of the rubber composition before the vulcanization is carried out. To deal with this problem, the present invention uses the nitrile rubber having a Mooney viscosity of 30–90 at 100° C. in combination with carbon black.

It the Mooney viscosity is below 30, a great amount of carbon black must be added to provide the predetermined productively and pre-vulcanization properties of the rubber composition, failing to provide the desired properties when the vulcanization is carried out. On the contrary, if the Mooney viscosity exceeds 90, the desired properties can obtained by a small amount of carbon black added to the nitrile rubber but it is still difficult to obtain the prescribed productivity and pre-vulcanization properties of the rubber composition.

In addition, if the proportion of the zinc polymethacrylate, based on 100 parts by weight of nitrile rubber, is less than 20 parts by weight, the cured (vulcanized) rubber belt body exhibits an insufficient on-load performance. On the other hand, if the proportion of the zinc polymethacrylate, based on 100 parts by weight of nitrile rubber, exceeds 60 parts by weight, the hardness of the cured rubber belt body goes up and hence deteriorates the flexibility of the belt body. This may lead to a considerable reduction of the lifetime of the toothed belt and a generation of increased noise during operation of the toothed belt.

The present invention utilizes high-strength glass fibers as the tensile member because the high-strength glass fibers exhibit a little dimensional change against changes in surrounding conditions and hence can stabilize a tension in the toothed bent while in use. The high-strength glass fibers thus used are effective to elongate the lifetime of the toothed belt and suppress the generation of operation noises while the toothed belt is running.

It is preferable that the tensile member has a resorcin-formalin-latex layer and an overcoat layer both formed by a pre-treatment. The tensile member treated thusly exhibits good adhesion to the rubber tooth body and is free from separation from the rubber tooth body. In addition, the latex and overcoat layers prevent breakage of the fibers caused by the rubbing between the fibers and thereby improves the integrity between the fibers as well as the integrity between adjacent cords formed by the high-strength glass fibers and jointly forming the tensile member. Thus, even when the hardness of the cured rubber belt body becomes high, the reduction of the flexural fatigue resistance of the toothed belt is very small. Accordingly, the toothed belt as a whole has a prolonged service life.

BRIEF DESCRIPTION OF THE DRAWINGS

The present invention will be better understood from the description of the preferred embodiments of the invention set forth below, together with the accompanying drawings, in which.

DETAILED DESCRIPTION OF THE PREFERRED EMBODIMENTS

The following description is merely exemplary in nature and is in no way intended to limit the invention or its application or use.

Figure 1:
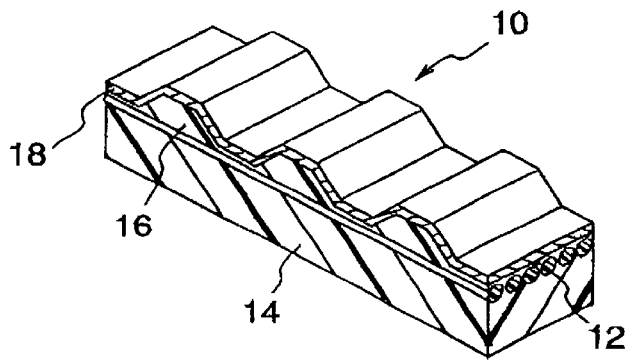
FIG. 1 is a fragmentary perspective view of a toothed belt according to an embodiment of the present invention.

FIG. 1 shows a toothed belt according to an embodiment of the present invention. The toothed belt 1 includes a tensile member 12, a cured rubber belt body 14 in which the tensile member 12 is embedded, and a tooth fabric 18 adhered to the surface of teeth 16 of the belt body 14. The tensile member is comprised of a plurality of parallel spaced reinforcement cords disposed in a plane extending on and along a pitch line of the toothed belt 10. Though not shown, the reinforcement cords are twisted cords and these cords are arranged such that the direction of twist in one reinforcement cord is opposite to that in an adjacent reinforcement cord.

The toothed belt 10 of the present invention is primarily used for achieving power transmission in general industrial machineries. The toothed belt 10 thus is available to replace a conventional power transmission system achieved by a chain. In this particular use or application, on-load performance (load-bearing properties) of the toothed belt 10 is particularly important.

According to the present invention, hydrogenated nitrile rubber and zinc polymethacrylate are used as components of a rubber composition in order to form a heavy-duty toothed belt which is capable of withstanding heavy loads applied when the toothed belt is used in the general industrial machineries. The hydrogenated nitrile rubber and the zinc polymethacrylate are blended together within an appropriate range of blending ratio.

The cured rubber belt body 14 of the toothed belt 10 is formed primarily from a vulcanizable rubber composition containing hydrogenated nitrile rubber and zinc polymethacrylate as major ingredients. The hydrogenated nitrile rubber used in the first embodiment has a nitrile content of 30 to 50% and an iodine value of 4–28 g. The aforesaid range of the nitrile content covers nitrile contents of substantially all nitrile rubbers available in the market.

The iodine value varies with percentage of hydrogenation and has an effect on formation of a higher-order network structure by the zinc polymethacrylate.

The rubber composition contains the zinc polymethacrylate and the hydrogenated nitrile rubber which are blended in a ratio of from 22:78 to 45:55 parts by weight. In the first embodiment, in order to have the zinc polymethacrylate homogeneously dispersed in the hydrogenated nitrile rubber, a polymer alloy composite material is prepared by dispersing the zinc polymethacrylate into the hydrogenated nitrile rubber in a ratio of from 40:60 to 50:50 parts by weight, and after that the polymer alloy composite material and the hydrogenated nitrile rubber are blended together in a ratio of from 55:45 to 90:10 parts by weight.

The cured rubber belt body 14 is formed by vulcanizing and pressing (or otherwise molding) the above-mentioned vulcanizable rubber composition, with a vulcanizing agent comprised of peroxide and a reinforcer comprised of carbon black being added to the rubber composition.

Preferred examples of the peroxide include dicumyl peroxide, t-butyl cumyl peroxide, and bis(t-butyl peroxidiisopropyl) benzene. The amount of (—O—O— group of) peroxide added with respect to 100 g rubber composition is in the range of from 0.24 to 0.91 g for the hydrogenated nitrile rubber and from 0.047 to 0.3 g for nitrile rubber.

The carbon black is added to the rubber composition in a weight ratio of from 5:100 to 50:100. If the proportion of carbon black is below 5 parts by weight, the productivity of the rubber belt body becomes worse due to reduction of green strength in the wet state. On the contrary, if the carbon black proportion exceeds 50 parts by weight, the hardness of the rubber belt body becomes excessively higher than a practically available hardness level. Some quantity of carbon black added is effective to improve the adherence.

The tensile member 12 comprised of plural twisted reinforcement cords is made of high-strength glass fibers. The high-strength glass fibers, as opposed to the conventional polyamide fibers, exhibit a little dimensional change against changes in surrounding conditions and hence can stabilize a tension in the toothed belt while in use and hold appropriate meshing between teeth on the toothed belt teeth on a pulley. In case of the toothed belt used in the general industrial machineries, it is likely that the cured rubber belt body 14 and the tensile member 12 separate from one another due to a heavy load applied thereto. To avoid the occurrence of such separations the glass fibers have a resorcin-formalin-latex layer and an overcoat layer formed in the order named. The overcoat layer is formed by treating the glass fibers with a rubbery solution containing a resin or a filler dispersed in a rubber matrix.

The tensile member 12 thus treated has an improved degree of adherence to the cured rubber belt body 14 and hence can prevent accidental separation or peel-off of the cured rubber belt body 14 from the tensile member 12. In addition, since the integrity between the fibers and the integrity between adjacent reinforcement cords are improved by the latex and overcoat layers, even when the hardness of the cured rubber belt body 14 is increased with an increase in the proportion of zinc polymethacrylate, reduction of the flexural fatigue resistance of the toothed belt 10 is very small. Accordingly, the toothed belt 10 as a whole has a prolonged service life.

According to a second embodiment of the present invention, the cured rubber belt body 14 is formed primarily from a rubber composition containing nitrile rubber and zinc polymethacrylate as main components. Some types of general industrial machineries or certain environmental conditions do not require the toothed belt to possess the heat resistance and ozone resistance. In such a particular use or application, the hydrogenated nitrile rubber can be replaced by nitrile rubber to avoid presence of over-quality.

Preferred examples of the nitrile rubber used in that case include nitrile rubber with a nitrile content in the range of from 15 to 55% and having a Mooney viscosity of 30–90 at 100° C. Almost all commercially available hydrogenated nitrile rubbers have nitrile contents which fall within the range of nitrile content specified above. To the rubber composition, peroxide and carbon black are added in the same manner as done in the first embodiment described previously. In the second embodiment, a tensile member is also embedded in the cured rubber belt body, and a tooth fabric is adhered to the surface of teeth on the cured rubber belt body in the same manner as done in the first embodiment.

Table 1 given below shows the results of a running test which was done about Inventive Examples 1 and 2 (corresponding to the toothed belt according to the first embodiment and the toothed belt according to the second embodiment, respectively, of the present invention), and a Comparative Example under the conditions enumerated below.

1. Belt Size
   Tooth pitch: 14.0 mm
   Width: 20.0 mm
2. Durability Test
   Number of teeth on drive and driven pulleys: 30/30
   Number of revolution: 2000 rpm
   Loading tension: 120 kgf
3. Noise Measurement
   Number of teeth on drive and driven pulleys; 30/30

Number of revolution: 3000 rpm
Loading tension: nil (no-loaded condition)
Measuring position: 100 mm distant from pulley 4. Materials

INVENTIVE EXAMPLE 1

Rubber belt body: hydrogenated nitrile rubber blended with zinc polymethacrylate polymer alloy
Tensile member: high-strength glass fibers
Tooth fabric: nylon canvas

INVENTIVE EXAMPLE 2

Rubber belt body: nitrile rubber blended with zinc polymethacrylate
Tensile member: high-strength glass fibers
Tooth fabric: nylon canvas

Comparative Example

Rubber belt body: urethane rubber
Tensile member: aramide fibers
Tooth fabric: nylon canvas Running conditions were so set as to simulate a heavily loaded low speed operation as actually experienced in the general industrial machineries.

TABLE 1

|  | Lifetime (hours) | Elongation After Test (%) | Residual Strength (%) | Sound Pressure Level (dB [A]) |
| --- | --- | --- | --- | --- |
| Inventive Example 1 | 1044 | 0.21 | 89 | 92 |
| Inventive Example 2 | 821 | 0.17 | 92 | 90 |
| Comparative Example | 542 | 0.24 | 62 | 98 |

The test results shown in Table 1 indicate that with respective all tested items (lifetime, elongation after test, residual strength and sound pressure level), Inventive Examples 1 and 2 are superior to Comparative Example. It may be considered that the superiority of Inventive Examples 1 and 2 results from (1) an increased rigidity of the cured rubber belt body obtained by properly changing the proportion of zinc polymethacrylate in the rubber composition, and (2) effective suppression of changes in the toothed belt tension and the resulting appropriate meshing between the toothed belt and teeth on the pulleys that are achieved by the high-strength glass fibers used to form the tensile member.

Figure 2:
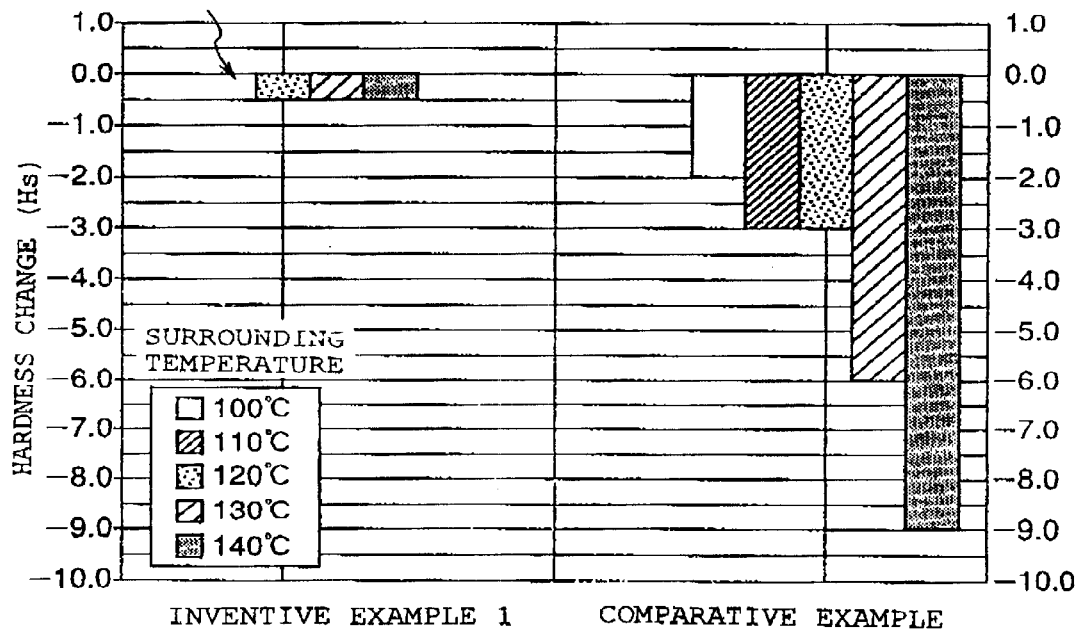
FIG. 2 is a histogram showing a temperature-induced hardness change of the toothed belt (Inventive Example 1) as compared to that of a Comparative Example.

FIG. 2 shows the results of a measurement made on Inventive Example and Comparative Example for checking a hardness change according to the surrounding temperature. The hardness change is closely related to the teeth breakage resistance. It appears from FIG. 2 that with respect to inventive Example 1, no hardness change were observed at both 100° C. and 110° C. This means that at temperatures below the normal surrounding temperature of the working or operating general industrial machineries, the toothed belt of the present invention is able to maintain the prescribed physical properties.

Obviously, various minor changes and modifications of the present invention are possible in the light of the above teaching. It is therefore to be understood that within the scope of the appended claims, the present invention may be practiced otherwise than as specifically described.

What is claimed is:

1. A toothed belt comprising:

a cured rubber belt body formed primarily from a vulcanizable rubber composition containing hydrogenated nitrile rubber and zinc polymethacrylate; and a tensile member embedded in said belt body, wherein said rubber composition is comprised of zinc polymethacrylate and hydrogenated nitrile rubber having an iodine value of 4–28 g, said zinc polymethacrylate and said hydrogenated nitrile rubber being blended together in a ratio of 22:78 to 45:55 parts by weight.

2. A toothed belt according to claim 1, wherein said tensile member is made of high-strength glass fibers.

3. A toothed belt according to claim 1, wherein said rubber composition is formed of a polymer alloy composite material and hydrogenated nitrile rubber having an iodine value of 4–28 g, said polymer alloy composite material and said hydrogenated nitrile rubber being blended together in a ratio of 55:45 to 90:10 parts by weight, said polymer alloy composite material being formed of zinc polymethacrylate and hydrogenated nitrile rubber having an iodine value of 4–28 g, said zinc polymethacrylate and said hydrogenated nitrile rubber being dispersed in a ratio of 40:60 to 50:50 parts by weight to form the polymer alloy composite before the polymer alloy composite is blended with the hydrogenated nitrile rubber.

4. A toothed belt according to claim 3, wherein said tensile member is made of high-strength glass fibers.

5. A toothed belt according to claim 3, wherein said cured rubber belt body further contains a vulcanizing agent consisting of 0.24 to 0.91 g peroxide added with respect to 100 g of said rubber composition, and a reinforcer consisting of carbon black added to said rubber composition in a weight ratio of from 5:100 to 50:100.

6. A toothed belt comprising:

a cured rubber belt body formed primarily from a vulcanizable rubber composition containing nitrile rubber having a Mooney viscosity of 30–90 at 100° C. and zinc polymethacrylate; and a tensile member embedded in said belt body, wherein said nitrile rubber and said zinc polymethacrylate are blended together in a ratio of 100:20 to 100:60 parts by weight.

7. A toothed belt according to claim 6, wherein said cured rubber belt body further contains a vulcanizing agent consisting of 0.047 to 0.31 g peroxide added with respect to 100 g of said rubber composition, and a reinforcer consisting of carbon black added to said rubber composition in a weight ratio of from 5:100 to 50:100.

8. A toothed belt according to claim 6, wherein said tensile member is made of high-strength glass fibers.

9. A toothed belt according to claim 1, wherein said cured rubber belt body further contains a vulcanizing agent consisting of 0.24 to 0.91 g peroxide added with respect to 100 g of said rubber composition, and a reinforcer consisting of carbon black added to said rubber composition in a weight ratio of from 5:100 to 50:100.

* * * * *